(12) United States Patent  (10) Patent No.: US 8,695,664 B2
Fujioka  (45) Date of Patent: Apr. 15, 2014

(54) PNEUMATIC TIRE WITH SPECIFIED SIDE WALL MARK

(75) Inventor: Tsuyoshi Fujioka, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 730 days.

(21) Appl. No.: 12/482,657

(22) Filed: Jun. 11, 2009

(65) Prior Publication Data

US 2010/0051159 A1  Mar. 4, 2010

(30) Foreign Application Priority Data

Aug. 26, 2008 (JP) ................... 2008-216837

(51) Int. Cl.
*B60C 13/02* (2006.01)
*B60C 13/00* (2006.01)

(52) U.S. Cl.
CPC ............. *B60C 13/001* (2013.04); *B60C 13/02* (2013.01)
USPC .......................................... 152/523; 152/524

(58) Field of Classification Search
USPC .......................... 152/523, 524, 525
See application file for complete search history.

(56) References Cited

U.S. PATENT DOCUMENTS 5,645,661 A * 7/1997 Clementz et al. ............. 152/523
7,232,498 B2 * 6/2007 Zimmer et al. ............ 152/524 X
2002/0074071 A1 6/2002 Oyama
2005/0081975 A1 4/2005 Sano
2007/0256771 A1 * 11/2007 Balogh et al. ................. 152/525

FOREIGN PATENT DOCUMENTS

| EP | 0 253 557 | 1/1988 |
|---|---|---|
| EP | 0 490 247 | 6/1992 |
| JP | 63-074703 | 4/1988 |
| JP | 09-086106 | 3/1997 |
| JP | 10-067208 | 3/1998 |
| JP | 2002-127717 | 5/2002 |
| JP | 2006-256432 | 9/2006 |
| WO | 03/055700 | 7/2003 |

OTHER PUBLICATIONS

Online version of Webster's Third New International Dictionary, Unabridged, Merriam-Webster, Inc., 1993, definition of the noun "step".*

Office Action for Japanese Patent Application No. 2008-216837 dispatched Sep. 25, 2012 (English translation only).

* cited by examiner

*Primary Examiner* — Adrienne C Johnstone

(74) *Attorney, Agent, or Firm* — Fish & Richardson P.C.

(57) ABSTRACT

A pneumatic tire has a distinguishing mark is formed on a surface of a side wall portion. The pneumatic tire comprises a first protruding portion protruding along a profile of the mark and a second protruding portion protruding at a height which is lower than the first protruding portion, adjacent to an outer side of the first protruding portion.

7 Claims, 6 Drawing Sheets

PNEUMATIC TIRE WITH SPECIFIED SIDE WALL MARK

BACKGROUND OF THE INVENTION

1. Field of the Invention

The present invention relates to a pneumatic tire in which a distinguishing mark such as a character, a numeral, a symbol or a graphic is formed on a surface of a side wall portion.

2. Description of the Related Art

In general, a distinguishing mark is formed on a side wall portion of a tire. The mark is constituted by a character, a numeral, a symbol, a graphic or the like displaying a manufacturer or a type of the tire, and is provided so as to protrude from the surface of the side wall portion. A recessed portion corresponding to the mark is provided in a mold forming the tire, and the mark is formed by making rubber in the side wall portion flow into the recessed portion during cure.

There is a case that the distinguishing mark is formed by a color (for example, white) which is different from a color of a main body of the side wall portion (refer to Japanese Unexamined Patent Publication No. 9-86106), however, it is often the case that the mark is formed by a color (normally black) which is the same as the main body of the side wall portion. In such a case, particularly, since it is hard to distinguish the mark from a peripheral portion thereof, it is important to increase a visibility of the mark.

In the Japanese Unexamined Patent Publication Nos. 9-86106, 63-74703, 10-67208, and 2002-127717, there is disclosed a pneumatic tire in which a protruding portion is provided along a profile of the distinguishing mark, and it is possible to somewhat achieve an effect of emphasizing the profile of the mark so as to increase the visibility. However, in the case that the protruding portion is formed high, there is a problem that a rubber supply to a metal mold recessed portion corresponding to the protruding portion becomes short, whereby a protruding portion forming a defect called as a bare is generated, or a stress is concentrated on a root of the protruding portion and a crack is generated. Therefore, a method which can further increase the visibility of the mark while solving the above problems is desired.

SUMMARY OF THE INVENTION

The present invention is made in view of the above-mentioned conditions, and an object of the present invention is to provide a pneumatic tire which can increase a visibility of a distinguishing mark while preventing a bare and a crack from being generated in the mark.

The object can be achieved by the following present invention. That is, the present invention provides a pneumatic tire in which a distinguishing mark is formed on a surface of a side wall portion, the pneumatic tire comprising a first protruding portion protruding along a profile of the mark and a second protruding portion protruding at a height which is lower than the first protruding portion, adjacent to an outer side of the first protruding portion.

In the pneumatic tire according to the present invention, since the second protruding portion which is lower than the first protruding portion is provided adjacent to the outer side of the first protruding portion protruding along the profile of the distinguishing mark, the recessed portion corresponding thereto is formed in a step shape, and the rubber tends to easily flow into a deepest portion of the recessed portion during cure. Accordingly, even in a case that the protruding portion is formed high, it is possible to prevent the bare from being generated in the distinguishing mark. Further, since the second protruding portion is adjacent to a root of the first protruding portion, it is possible to disperse a stress generated at the root so as to prevent the crack from being generated. In addition, it is possible to emphasize the profile of the distinguishing mark so as to largely present a whole, and it is possible to obtain an effect of improving the visibility.

In the present invention, it is preferable that a serration is formed on an upper face of the second protruding portion. Accordingly, since it is possible to give a change to a gloss of the second protruding portion, it is possible to increase a contrast between the second protruding portion and a peripheral portion thereof so as to improve the visibility of the mark. A serration indicates a surface with projections and depressions formed by arranging in parallel a number of protruding lines at a predetermined interval. In a surface in which the serration is formed, light is reflected in a direction different from a smooth flat surface, and a difference of brightness is generated in an outer appearance.

As a preferred embodiment of the present invention, there is a structure in which a shadow region of the mark based on a projective method is formed by the second protruding portion, in such a manner as to apply an apparent depth to the mark. According to such a structure, since the mark is stereoscopically represented by the projective method, it is possible to effectively increase the visibility of the mark. As the projective method, either a parallel projection or a perspective projection may be employed.

In the above structure, it is preferable that a narrow groove along a direction of the apparent depth is provided in the second protruding portion, at a corner portion of the mark. Accordingly, it is possible to present the apparent depth of the mark with further emphasis, and to improve the visibility of the mark by extension.

Further, in the above structure, it is preferable that an outer edge of the second protruding portion is formed in a circular arc, at a corner portion of the mark, and a narrow groove along a direction of the apparent depth is provided in the second protruding portion so as to pass through portions in a vicinity of both ends of the circular arc. Accordingly, it is possible to present the apparent depth of the mark with further emphasis, and to improve the visibility of the mark by extension.

In the present invention, it is preferable that a serration is formed on an inner portion of the mark surrounded by the first protruding portion and an upper face of the second protruding portion, and wherein the serration formed in the second protruding portion is differentiated from the serration formed in the inner portion of the mark in an extending direction of a protruding line or an interval of the protruding lines. According to such a structure, by making the glosses of the inner portion of the mark and the second protruding portion different, it is possible to increase a contrast thereof so as to increase a stereoscopic effect of the mark, and it is possible to improve the visibility.

The first protruding portion and the second protruding portion exclusive of any of the serrated surface protruding lines can form a step shape, the upper face of the second protruding portion exclusive of any serrated surface protruding lines being positioned at a height which is between 30 and 80% of the height of the first protruding portion. The height of each of the serrated surface protruding lines can be smaller than the height of the second protruding portion exclusive of any of the serrated surface protruding lines.

In the present invention, it is possible to further comprise a third protruding portion formed by protruding the inner portion of the mark surrounded by the first protruding portion at a greater height than the first protruding portion, in place of the second protruding portion or in addition to the second protruding portion. In such a case, the recessed portion is formed in the step shape which is deeper toward an inner side of the mark, and an edge portion along the profile of the mark is provided in stages. As a result, it is possible to prevent the edge portion positioned in the inner side from being roundly ground by buffing or the like when finishing the mold, and it is possible to secure the visibility while keeping the profile of the mark.

DETAILED DESCRIPTION OF THE PREFERRED EMBODIMENTS

Figure 1:
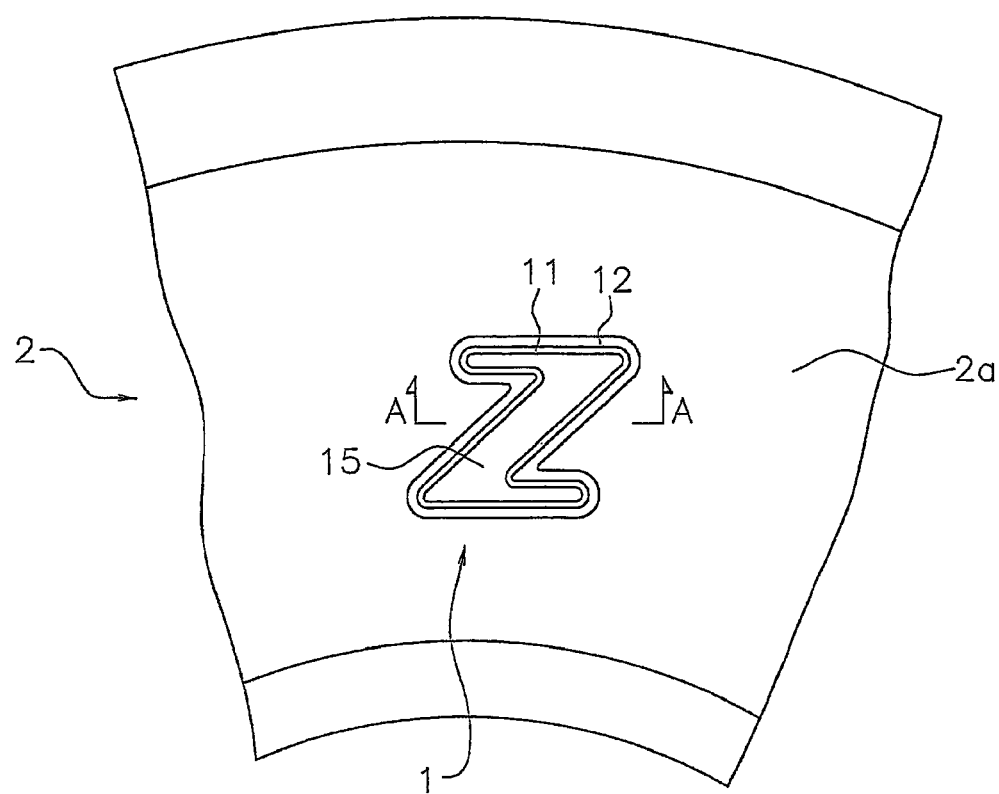
FIG. 1 is a front view of a main part of a side wall portion in an example of a pneumatic tire according to the present invention.

An embodiment of the present invention will be explained with reference to the drawings. A pneumatic tire according to the present invention is structured, as exemplified in FIGS. 1 and 2, such that a distinguishing mark 1 is formed on a surface 2a of a side wall portion 2. In the embodiment described below, only one character "Z" is illustrated as the distinguishing mark, however, the present invention can employ other characters, numerals, symbols and graphics, and a plurality of distinguishing marks are generally arranged along a circumferential direction of a tire. It should be noted that, in practice, there is a case where a rate of a region occupied by the mark 1 with respect to the side wall portion 2 becomes smaller or larger.

The mark 1 is slightly higher than the surface 2a of the side wall portion 2, and has a first protruding portion 11 protruding along a profile of the mark 1 in such a manner as to edge the character "Z", and a second protruding portion 12 protruding at a lower height than the first protruding portion 11 adjacent to an outer side of the first protruding portion 11. The second protruding portion 12 is formed over a whole periphery of the profile of the mark 1, in such a manner as to surround the first protruding portion 11.

Figure 2:
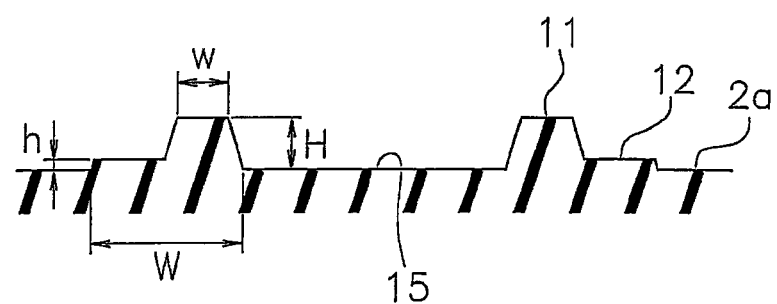
FIG. 2 is a cross sectional view as seen from an arrow A-A in FIG. 1.

The mark 1 mentioned above is formed by a mold having a step shaped recessed portion corresponding to the first protruding portion 11 and the second protruding portion 12. During cure, since the recessed portion is formed in the step shape, rubber in the side wall portion 2 tends to flow into a deepest portion of the recessed portion, thereby preventing a bare from being generated. Further, as shown in FIG. 2, since the second protruding portion 12 is adjacent to a root of the first protruding portion 11, it is also possible to prevent a crack from being generated. The profile of the mark 1 is emphasized by the second protruding portion 12 so as to largely show a whole, and an effect of improving a visibility can be obtained.

It is preferable that a height h of the second protruding portion 12 is between 30 and 80% with respect to a height H of the first protruding portion 11. It is possible to securely improve a rubber supply to the recessed portion by making a ratio h/H not less than 30%, and it is possible to suitably prevent the bare from being generated. Further, it is possible to reinforce the root of the first protruding portion 11 so as to effectively suppress the crack, while preventing the crack from being generated in the root of the second protruding portion 12, by making the ratio h/H not more than 80%. The height H of the first protruding portion 11 is set, for example, to 0.5 to 2.0 mm.

It is preferable that a width w of an upper face of the first protruding portion 11 is not less than the height H of the first protruding portion 11, and if a ratio w/H is less than 1.0, there is a tendency that the effect of improving the rubber supply to the recessed portion becomes smaller. Further, with a similar reason, it is preferable that a width W of the root of the whole protruding portion is three times or more of the height H of the first protruding portion 11.

Although not illustrated, it is preferable to form each of a boundary between the root of the first protruding portion 11 and an inner portion 15, and a boundary between the root of the second protruding portion 12 and the surface 2a of the side wall portion 2 in a circular arc-shaped cross sectional shape, for increasing a crack resistance of the mark 1.

The inner portion 15 of the mark 1 surrounded by the first protruding portion 11 does not protrude, and is formed at the same height as the surface 2a of the side wall portion 2. Accordingly, a difference of elevation with respect to the first protruding portion 11 is secured, and the profile of the mark 1 is emphasized so as to increase the visibility. In the present invention, since it is possible to form the first protruding portion 11 high while preventing the bare and the crack from being generated, the above-mentioned structure is useful.

In the present invention, it is preferable that an outer periphery of the second protruding portion 12 is not depressed, but is formed at a height which is equal to or higher than the surface 2a of the side wall portion 2. Accordingly, it is possible to make the rubber of the sidewall portion 2 flow smoothly into the recessed portion during the cure, and it is possible to suitably prevent the bare from being generated in the mark 1.

Figure 3:
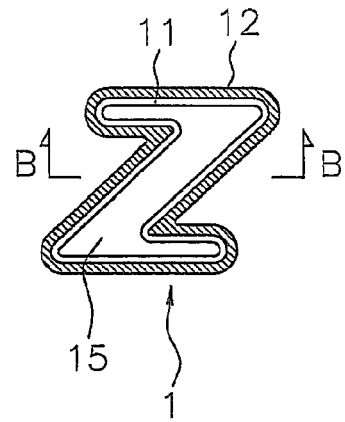
FIG. 3 is a modified example of a distinguishing mark shown in FIG. 1.
Figure 4:
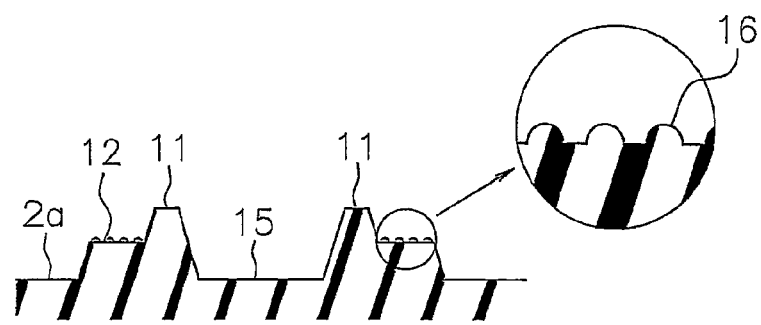
FIG. 4 is a cross sectional view as seen from an arrow B-B in FIG. 3.

In a case that a serration is formed on the upper face of the second protruding portion 12, as shown in FIGS. 3 and 4, it is possible to give a change to a gloss of the second protruding portion 12. Accordingly, it is possible to increase a contrast with respect to the peripheral portion in which the serration is not formed and the first protruding portion 11, and emphasize the profile of the mark 1 so as to improve the visibility. In the same manner, it is possible to form the serration in the inner portion 15 of the mark 1, and to increase the contrast with respect to the first protruding portion 11 so as to improve the visibility.

The serration is structured by arranging in parallel a number of protruding lines 16 each having a small height as shown in FIG. 4 at a predetermined interval. In the present embodiment, a cross section of the protruding line 16 has a semicircular shape, however, is not limited thereto, but can employ various shapes such as a trapezoidal shape, a triangular shape and the like. The height of the protruding line 16 is, for example, between 0.2 and 2.0 mm, however, is set smaller than the height h of the second protruding portion 12. A width of the protruding line 16 is preferably between 0.2 and 2 mm, and an interval between the protruding lines 16 is preferably 0.6 to 4 times the height of the protruding line 16.

Figure 5:
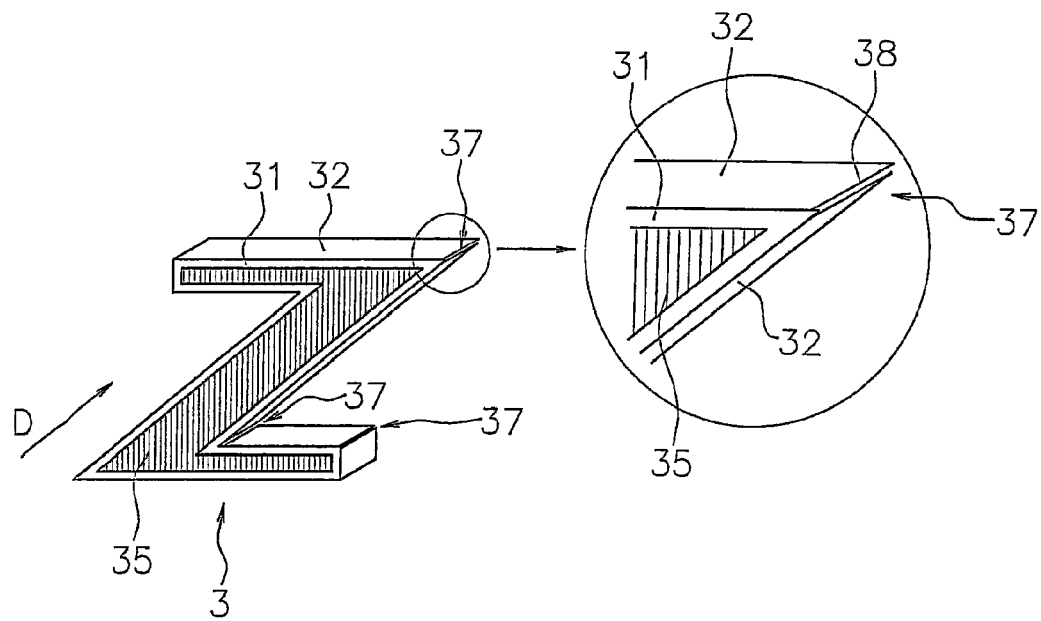
FIG. 5 is a view showing a distinguishing mark according to another embodiment of the present invention.

FIG. 5 shows a distinguishing mark according to another embodiment of the present invention. The distinguishing mark 3 has a first protruding portion 31 protruding along a profile of the mark 3, and a second protruding portion 32 protruding at a height which is lower than the first protruding portion 31 adjacent to an outer side of the first protruding portion 31, similar to the mark 1 mentioned above. The second protruding portion 32 does not extend over a whole periphery of the profile of the mark 3, but is formed only in a predetermined region.

In other words, the second protruding portion 32 forms a shadow region of the mark 3 based on a projective method, in such a manner as to give an apparent depth to the mark 3. In this example, there is shown an oblique projection (one of parallel projections) when applying a light beam from a lower left side of the mark 3. Since the shadow region is protruded as mentioned above, the mark 3 can be stereoscopically and clearly represented, and the visibility of the mark 3 can be increased effectively. An arrow D shows an apparent depth direction.

In a corner portion 37 at which segments constituting the profile of the mark 3 intersect, a narrow groove 38 extending along the apparent depth direction D is provided in the second protruding portion 32. Accordingly, the apparent depth of the mark 3 can be presented with greater emphasis, and the stereoscopic effect of the mark 3 can be increased to improve the visibility. In view of making the narrow groove 38 outstanding, it is preferable to make a depth of the narrow groove 38 equal to the height of the second protruding portion 32, and make a groove bottom at the same height as the surface 2a of the side wall portion 2.

Figure 6:
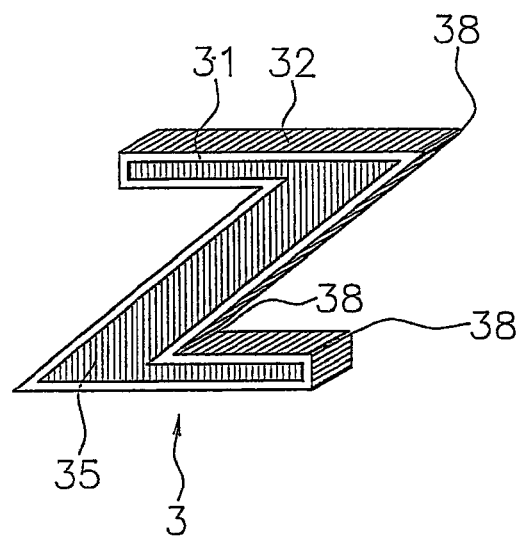
FIG. 6 is a modified example of a distinguishing mark shown in FIG. 5.

In FIG. 5, there is shown the example in which the serration is formed only in the inner portion 35 of the mark 3, however, it is preferable to form the serration also on an upper surface of the second protruding portion 32 as shown in FIG. 6, and moreover, it is preferable that the serration is not formed in the first protruding portion 31. Accordingly, it is possible to effectively emphasize the profile of the mark 3, and the visibility can be well increased. In this case, in view of making the narrow groove 38 outstanding, it is preferable that the protruding line of the serration extends in a different direction from the narrow groove 38.

In the mark 3 in FIG. 6, the serration formed in the second protruding portion 32 is differentiated from the serration formed in the inner portion 35 in an extending direction of the protruding line. Specifically, in the serration formed in the second protruding portion 32, the protruding line extends in a diametrical direction of the tire, and in the serration formed in the inner portion 35, the protruding line extends in a direction inclined at 45 degrees to the diametrical direction of the tire. According to the structure mentioned above, it is possible to increase the contrast between the inner portion 35 and the second protruding portion 32 so as to increase the stereoscopic effect of the mark 3.

In the structure mentioned above, the serration formed in the second protruding portion 32 may be differentiated from the serration formed in the inner portion 35 in an interval of the protruding lines. Since the narrower the interval of the protruding lines is, the darker it appears, the contrast between the inner portion 35 and the second protruding portion 32 is increased. In view of securing the effect of improving the contrast, it is preferable that a ratio W1/W2 of an interval W1 of the protruding lines in the inner portion 35 with respect to an interval W2 of the protruding lines in the second protruding portion 32 is between 0.5 and 0.8 or between 1.2 and 2.0.

Figure 7:
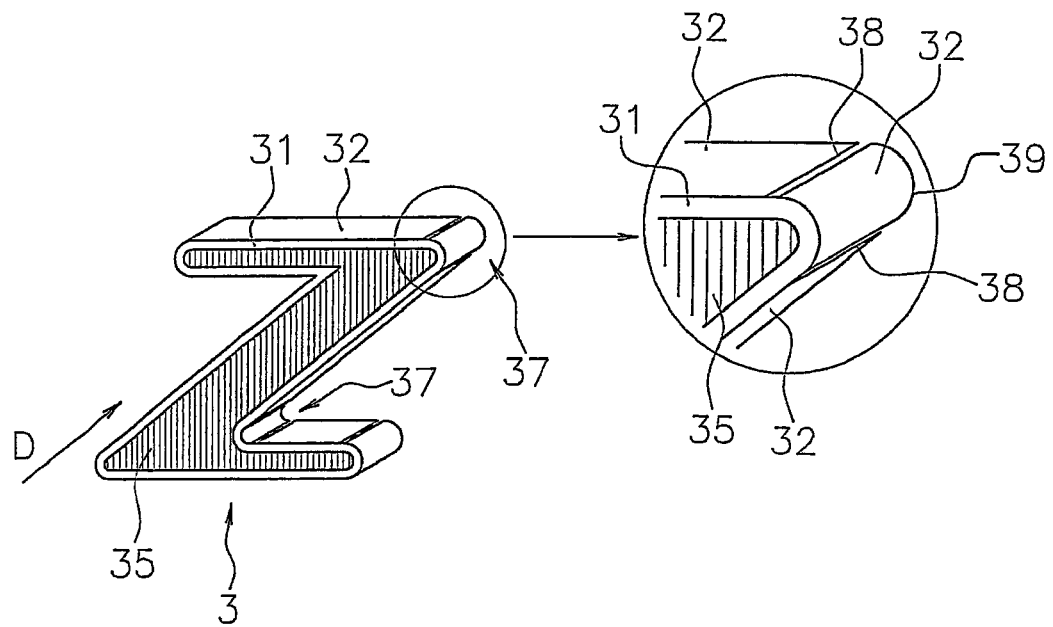
FIG. 7 is a modified example of a distinguishing mark shown in FIG. 6.

FIG. 7 shows a modified example of the distinguishing mark shown in FIG. 6, in which corners of the character "Z" are formed round. In the corner portion 37 of the mark 3, an outer edge of the second protruding portion 32 is formed by a circular arc 39, and the narrow groove 38 extending along an apparent depth direction D is provided in the second protruding portion 32 through portions in the vicinity of both ends of the circular arc 39. Accordingly, the apparent depth of the mark 3 can be presented with greater emphasis, and the stereoscopic effect of the mark 3 can be increased to improve the visibility.

Figure 8:
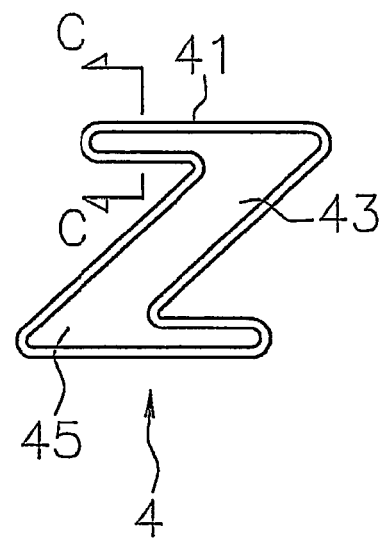
FIG. 8 is a view showing a distinguishing mark according to another embodiment of the present invention.
Figure 9:
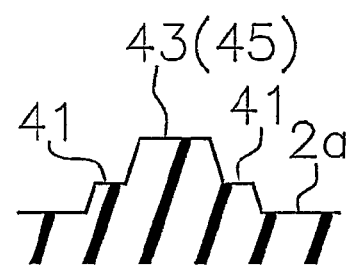
FIG. 9 is a cross sectional view as seen from an arrow C-C in FIG. 8.

FIGS. 8 and 9 are a view showing a distinguishing mark according to another embodiment of the present invention. The distinguishing mark 4 has a third protruding portion 43 formed by protruding an inner portion 45 of the mark 4 surrounded by a first protruding portion 41 at a greater height than the first protruding portion 41, in place of the second protruding portion. Note that a second protruding portion protruding at a smaller height than the first protruding portion 41 may be formed adjacent to an outer side of the first protruding portion 41. In the distinguishing mark 4, the serration can be formed in both or one of the first protruding portion 41 and the third protruding portion 43.

Figure 10:
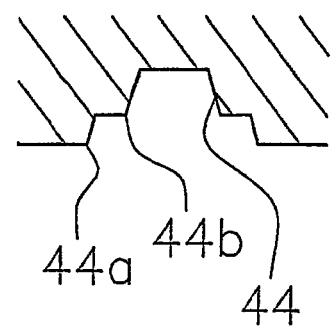
FIG. 10 is a cross sectional view of a recessed portion for forming the distinguishing mark shown in FIGS. 8 and 9.

As shown in FIG. 10, a recessed portion 44 for forming the mark 4 has a step shape which becomes deeper in an inner side of the mark. In the recessed portion 44, edge portions 44a and 44b extending along the profile of the mark 4 are provided in stages in the depth direction. Accordingly, an edge portion 44b positioned in an inner side becomes hard to be roundly ground by buffing or the like when finishing the mold, and it is possible to prevent the profile of the mark 4 from being blurred so as to secure the visibility.

The pneumatic tire in accordance with the present invention is the same as the normal pneumatic tire except that the distinguishing mark as mentioned above is formed on the surface of the side wall portion, and the present invention can employ any of the conventionally known material, shape, structure, manufacturing method and the like.

Figure 11:
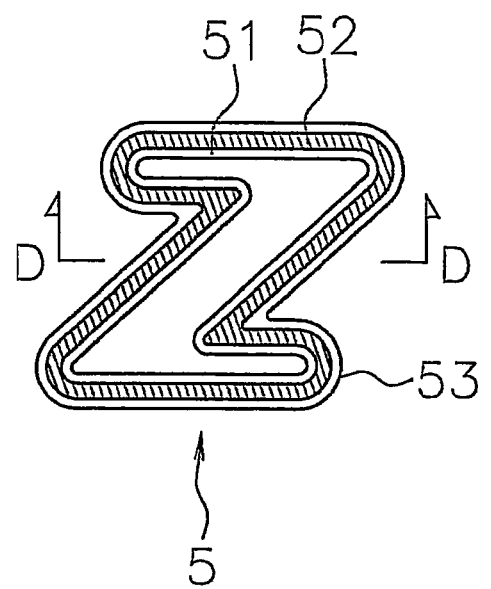
FIG. 11 is a view showing a distinguishing mark according to another embodiment of the present invention.
Figure 12:
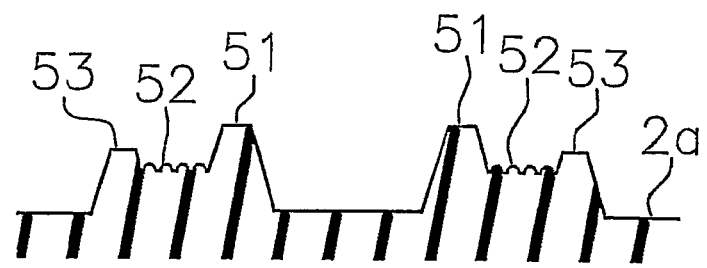
FIG. 12 is a cross sectional view as seen from an arrow D-D in FIG. 11.

Other Embodiment (1) In the distinguishing mark shown in the embodiment mentioned above, the portion around the outer side of the second protruding portion is formed at the same height as the surface of the side wall portion, however, in the present invention, it is preferable to form a profile protruding portion 53 adjacent to an outer side of a second protruding portion 52, such as a distinguishing mark 5 shown in FIGS. 11 and 12, to further emphasize the profile of the distinguishing mark. The profile protruding portion 53 is formed lower than the first protruding portion 51 and higher than the second protruding portion 52, and is set at a height which is, for example, between 60 and 90% with respect to a height of the first protruding portion 51.

In the case mentioned above, it is preferable to form upper faces of the first protruding portion 51 and the profile protruding portion 53 with a smooth flat surface in which the serration is not formed, while forming the serration in an upper face of the second protruding portion 52. Accordingly, it is possible to further emphasize the second protruding portion 52, and particularly in a case where the second protruding portion 52 forms the shadow region of the distinguishing mark, it is possible to effectively increase the stereoscopic effect of the distinguishing mark so as to increase the visibility.

Figure 13:
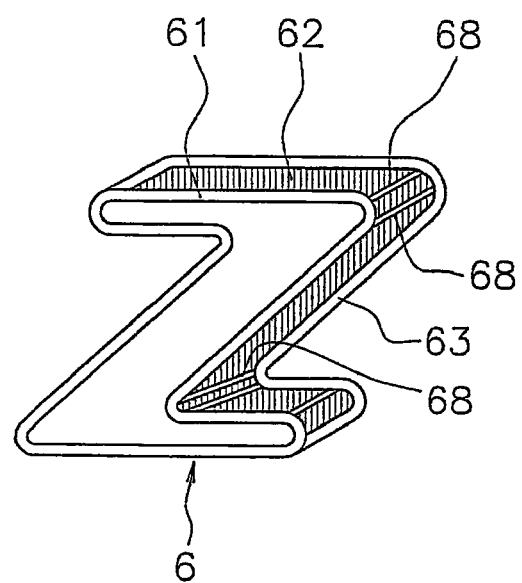
FIG. 13 is a view showing a distinguishing mark according to another embodiment of the present invention.

In a distinguishing mark 6 shown in FIG. 13, a second protruding portion 62 forms a shadow region of the distinguishing mark, and a profile protruding portion 63 which is lower than a first protruding portion 61 and higher than the second protruding portion 62 is formed adjacent to an outer side of the second protruding portion 62. In the second protruding portion 62, a narrow groove 68 is provided in the same manner as the distinguishing mark 3 shown in FIG. 7, and the stereoscopic effect is effectively increased, in cooperation with a profile emphasis generated by the profile protruding portion 63 and a serration of the second protruding portion 62.

(2) In the present invention, the serration may be formed on the upper face of the first protruding portion. In this case, however, it is preferable that the serration is not formed in the surface of the inner portion of the distinguishing mark, and the upper face of the second protruding portion, in view of emphasizing the serration.

Example

An example tire which concretely shows the structure and effect of the present invention will be explained. An evaluation of each of performances is executed as follows.

(1) Visibility

The visibility of the distinguishing mark was evaluated in accordance with an index number by evaluating at five levels by ten point allocating person so as to calculate a total point, and setting a result of a comparative example 1-1 to 100. Note that the visibility of the mark was evaluated by separating into two items including the stereoscopic effect and the contrast, in Table 2.

(2) Bare Resistance

A rate of occurrence of the bare in the distinguishing mark during cure of about fifty tires was measured. A comparative example 1-1 is set to 100 and a result is evaluated with indices, the more the numeric value is the more excellent the bare resistance is.

(3) Crack Resistance

A load of load index×50% was applied to a tire having 80% of a standard pneumatic pressure, after attaching to a constant temperature tank, ozone having a concentration of 90 PPHM was applied, a state (the length and depth of the crack) of the tire per a fixed time was checked, and the level of occurrence of length and depth of the crack at this time was indexed. A comparative example 1-1 is set to 100 and a result is evaluated with indices, the more the numeric value is the more excellent the crack resistance is.

Examples 1-1 to 1-5

The tires in which the distinguishing mark as shown in FIGS. 1 and 2 is formed in the surface of the side wall portion are set to examples 1-1 to 1-5. In this case, in the example 1-5, the serration is formed only in the upper face of the second protruding portion as shown in FIGS. 3 and 4.

Comparative Examples 1-1 and 1-2

A comparative example 1-1 is set to a tire having the same structure as the example 1-1 except that the second protruding portion is not formed. Further, a comparative example 1-2 is set to a tire structured such that the second protruding portion is not formed, but a protruding portion protruding at a height which is half the height of the first protruding portion is formed adjacent to the inner side of the first protruding portion. Results of the evaluation are shown in Table 1.

TABLE 1

|  | Example 1-1 | Example 1-2 | Example 1-3 | Example 1-4 | Example 1-5 | Comparative example 1-1 | Comparative example 1-2 |
| --- | --- | --- | --- | --- | --- | --- | --- |
| h/H | 0.5 | 0.1 | 0.9 | 0.5 | 0.5 | 0 | 0 |
| w/H | 1 | 1 | 1 | 0.5 | 1 | 1 | 1 |
| With or without serration | without | without | without | without | with | without | without |
| Visibility | 120 | 120 | 110 | 120 | 140 | 100 | 90 |
| Bare resistance | 100 | 100 | 100 | 90 | 100 | 100 | 100 |
| Crack resistance | 110 | 80 | 85 | 110 | 110 | 100 | 100 |

As shown in Table 1, in the examples 1-1 to 1-5, the visibility of the distinguishing mark can be improved in comparison with each of the comparative examples. Particularly, in the example 1-5, the visibility is dramatically increased by forming the serration in the second protruding portion. On the contrary, in the comparative example 1-2, since the protruding portion is formed in the inner side of the first protruding portion, the boundary between the inner portion and the first protruding portion becomes unclear and the visibility is deteriorated. Further, in the examples 1-2 to 1-4, the bare or the crack is somewhat generated in the distinguishing mark, and it is desirable to set the ratios h/H and w/H within the range mentioned above.

Examples 2-1 to 2-5

The tires in which the distinguishing mark as shown in FIG. 5 is formed in the surface of the side wall portion are set to examples 2-1 to 2-5. In the examples 2-1 to 2-4, the narrow groove is formed in the second protruding portion in the corner portion of the mark. Further, in the examples 2-2 to 2-5, the serration is formed in both or one of the inner portion of the mark and the second protruding portion. The direction of the serration (the extending direction of the protruding line) is expressed by an angle with respect to the diametrical direction of the tire. In this case, in the examples 2-1 to 2-5, the ratio h/H is set to 0.5 and the ratio w/H is set to 1.0, uniformly. Results of the evaluation are shown in Table 2.

TABLE 2

|  | | Example 2-1 | Example 2-2 | Example 2-3 | Example 2-4 | Example 2-5 | Comparative example 1-1 |
|---|---|---|---|---|---|---|---|
| Narrow groove | | with | with | with | with | without | without |
| With or without serration (inner portion/second protruding portion) | | without/without | with/without | without/with | with/with | with/with | without |
| Direction of serration (inner portion/second protruding portion) | | — | 90°/— | —/90° | 90°/0° | 90°/0° | — |
| Visibility | Stereoscopic effect | 110 | 120 | 110 | 140 | 120 | 100 |
| | Contrast | 100 | 130 | 130 | 150 | 130 | 100 |

As shown in Table 2, in the examples 2-1 to 2-5, it is possible to improve the visibility of the mark in comparison with the comparative example, and it is possible to express the stereoscopic effect in any example. Further, in the examples 2-2 and 2-5, since the direction of the serration is differentiated between the inner portion of the mark and the second protruding portion, it is possible to increase the contrast so as to improve the visibility.

What is claimed is:

1. A pneumatic tire in which a distinguishing mark is formed on a surface of a side wall portion, the pneumatic tire comprising:

a first protruding portion protruding along a profile of the mark; and a second protruding portion protruding at a height which is lower than the first protruding portion, adjacent to an outer side of the first protruding portion, wherein an upper face of the second protruding portion is formed to have either a flat surface or a serrated surface wherein a number of protruding lines are arranged, the first protruding portion and the second protruding portion exclusive of any of the serrated surface protruding lines form a step shape, the upper face of the second protruding portion exclusive of any serrated surface protruding lines is positioned at a height which is between 30 and 80% of the height of the first protruding portion, the height of each of the serrated surface protruding lines being smaller than the height of the second protruding portion exclusive of any of the serrated surface protruding lines, the first protruding portion surrounds an inner portion of the mark which is recessed as compared to an upper face of the first protruding portion, and a shadow region of the mark based on a projective method is formed by the second protruding portion in such a manner as to give an apparent depth to the mark.

2. The pneumatic tire according to claim 1, wherein a narrow groove along a direction of the apparent depth is provided in the second protruding portion, at a corner portion of the mark.

3. The pneumatic tire according to claim 1, wherein an outer edge of the second protruding portion is formed in a circular arc, at a corner portion of the mark, and a pair of narrow grooves extending along a direction of the apparent depth are provided in the second protruding portion so as to pass through portions thereof at each end of the circular arc.

4. The pneumatic tire according to claim 1, wherein the upper face of the second protruding portion is formed to have the serrated surface, an upper face of the inner portion of the mark surrounded by the first protruding portion and the upper face of the second protruding portion is formed to have a serrated surface wherein a number of protruding lines are arranged, and wherein the serrated upper face of the second protruding portion is differentiated from the serrated upper face of the inner portion of the mark in an extending direction of a protruding line or an interval of the protruding lines.

5. A pneumatic tire in which a distinguishing mark is formed on a surface of a side wall portion, the pneumatic tire comprising:

a first protruding portion protruding along a profile of the mark; and a second protruding portion protruding at a height which is lower than the first protruding portion, adjacent to an outer side of the first protruding portion, wherein an upper face of the second protruding portion is formed to have either a flat surface or a serrated surface wherein a number of protruding lines, each having a height between 0.2 and 2.0 mm, are arranged, the first protruding portion and the second protruding portion exclusive of any of the serrated surface protruding lines form a step shape, the upper face of the second protruding portion exclusive of any serrated surface protruding lines is positioned at a height which is between 30 and 80% of the height of the first protruding portion, the first protruding portion surrounds an inner portion of the mark which is recessed as compared to an upper face of the first protruding portion, and a shadow region of the mark based on a projective method is formed by the second protruding portion in such a manner as to give an apparent depth to the mark.

6. The pneumatic tire according to claim 5, wherein a narrow groove along a direction of the apparent depth is provided in the second protruding portion, at a corner portion of the mark.

7. The pneumatic tire according to claim 5, wherein the upper face of the second protruding portion is formed to have the serrated surface, an upper face of the inner portion of the mark surrounded by the first protruding portion and the upper face of the second protruding portion is formed to have a serrated surface wherein a number of protruding lines are arranged, and wherein the serrated upper face of the second protruding portion is differentiated from the serrated upper face of the inner portion of the mark in an extending direction of a protruding line or an interval of the protruding lines.

* * * * *